United States Patent
Cheng (10) Patent No.: US 10,564,749 B2
(45) Date of Patent: Feb. 18, 2020

(54) DISPLAY SCREEN ASSEMBLY, ASSEMBLING METHOD THEREOF AND ELECTRONIC DEVICE

(71) Applicant: GUANGDONG OPPO MOBILE TELECOMMUNICATIONS CORP., LTD., Dongguan (CN)

(72) Inventor: Jiao Cheng, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 277 days.

(21) Appl. No.: 15/707,249

(22) Filed: Sep. 18, 2017

(65) Prior Publication Data

US 2018/0196560 A1 Jul. 12, 2018

(30) Foreign Application Priority Data

Jan. 9, 2017 (CN) .......................... 2017 1 0013756
Jan. 9, 2017 (CN) ..................... 2017 2 0022967 U (51) Int. Cl.
*G06F 1/16* (2006.01)
*G06F 3/041* (2006.01)
(Continued)

(52) U.S. Cl.
CPC .......... *G06F 3/0412* (2013.01); *G06F 1/1626* (2013.01); *G06F 1/1637* (2013.01);
(Continued)

(58) Field of Classification Search
None
See application file for complete search history.

(56) References Cited

U.S. PATENT DOCUMENTS 8,442,593 B1 5/2013 Kwon et al.
9,189,016 B2 * 11/2015 Jang ...................... G06F 1/1652
(Continued)

FOREIGN PATENT DOCUMENTS

CN 202872874 U 4/2013
CN 204406408 U 6/2015
(Continued)

OTHER PUBLICATIONS

PCT application PCT/CN2017/102258 English translation of the International Search Report and Written Opinion, dated Nov. 29, 2017, 12 pages.
(Continued)

*Primary Examiner* — Courtney L Smith
*Assistant Examiner* — Rashen E Morrison
(74) *Attorney, Agent, or Firm* — Lathrop Gage LLP (57) ABSTRACT

A display screen assembly, an electronic device and an assembling method for the display screen assembly are provided. The display screen assembly includes a cover plate, a display screen, a bracket and a decoration enclosure. The cover plate includes a side edge. A top surface of the display screen is joined with a lower surface of the cover plate, a width of the display screen is larger than a width of the cover plate, and the side edge of the cover plate is indented inwards relative to the display screen. The bracket includes a top portion joined with a bottom surface of the display screen. The decoration enclosure includes a side surface joined with the side edge of the cover plate and is configured to shield a non-display area of the display screen.

17 Claims, 7 Drawing Sheets

(51) Int. Cl.
*H04M 1/18* (2006.01)
*H04M 1/02* (2006.01)
*G09G 3/3208* (2016.01)

(52) U.S. Cl.
CPC .......... *G06F 1/1643* (2013.01); *G06F 1/1656* (2013.01); *G06F 3/0416* (2013.01); *G09G 3/3208* (2013.01); *H04M 1/0266* (2013.01); *H04M 1/185* (2013.01); *H04M 1/0283* (2013.01)

(56) References Cited

U.S. PATENT DOCUMENTS

| | | | |
|---|---|---|---|
| 9,323,292 B2 * | 4/2016 | Bae ....................... | G06F 1/1656 |
| 9,578,149 B2 * | 2/2017 | Moon ................. | H04M 1/0202 |
| 2004/0212583 A1 | 10/2004 | Cobian | |
| 2009/0257207 A1 * | 10/2009 | Wang ..................... | G06F 1/1626 |
| | | | 361/752 |
| 2015/0331451 A1 * | 11/2015 | Shin ........................ | G06F 3/041 |
| | | | 345/173 |
| 2015/0365508 A1 | 12/2015 | Kwon et al. | |
| 2016/0299527 A1 * | 10/2016 | Kwak ................. | H04M 1/0266 |
| 2016/0320658 A1 | 11/2016 | Reightler et al. | |

FOREIGN PATENT DOCUMENTS

| | | |
|---|---|---|
| CN | 104866018 A | 8/2015 |
| CN | 104866021 A | 8/2015 |
| CN | 105022185 A | 11/2015 |
| CN | 204883473 U | 12/2015 |
| CN | 106101324 A | 11/2016 |
| CN | 106843388 A | 6/2017 |
| CN | 206364858 U | 7/2017 |

OTHER PUBLICATIONS

Chinese Patent Application No. 201710013756.3, English translation of Office Action dated Mar. 1, 2019, 13 pages.
Chinese Patent Application No. 201710013756.3, Office Action dated Mar. 1, 2019, 10 pages.
European Patent Application No. 17191809.7, extended Search and Opinion dated Mar. 16, 2018, 12 pages.

* cited by examiner

DISPLAY SCREEN ASSEMBLY, ASSEMBLING METHOD THEREOF AND ELECTRONIC DEVICE

CROSS-REFERENCE TO RELATED APPLICATIONS

This application claims priority to and benefits of Chinese Patent Application Nos. 201710013756.3 and 201720022967.9, filed with State Intellectual Property Office on Jan. 9, 2017, the entire content of which is incorporated herein by reference.

FIELD

The present disclosure relates to a technical field of mobile electronic devices, and particularly to a display screen assembly, an electronic device and an assembling method of the display screen assembly.

BACKGROUND

With developments of technologies, a smartphone is used more and more widely and has more and more functions, and hence has become a requisite electronic apparatus in people's daily lives. The existing smartphone has a low screen-to-body ratio, so that a user experience of a user is poor.

SUMMARY

According to a first aspect of embodiments of the present disclosure, there is provided a display screen assembly. The display screen assembly includes a cover plate, a display screen, a bracket and a decoration enclosure. The cover plate includes a side edge. A top surface of the display screen is joined with a lower surface of the cover plate, a width of the display screen is larger than a width of the cover plate, and the side edge of the cover plate is indented inwards relative to the display screen. The bracket includes a top portion, and a bottom surface of the display screen is joined with the top portion of the bracket. The decoration enclosure includes a side surface joined with the side edge of the cover plate and is configured to shield a non-display area of the display screen.

According to a second aspect of embodiments of the present disclosure, there is provided an electronic device. The electronic device includes a display screen assembly and a rear cover coupled to the display screen assembly to define an accommodating space therebetween. The display screen assembly includes a cover plate, a display screen, a bracket and a decoration enclosure. The cover plate includes a side edge. A top surface of the display screen is joined with a lower surface of the cover plate, and a width of the display screen is larger than a width of the cover plate. The bracket includes a top portion, and a bottom surface of the display screen is joined with the top portion of the bracket. The decoration enclosure includes a side surface joined with the side edge of the cover plate and is configured to shield a non-display area of the display screen.

According to a third aspect of embodiments of the present disclosure, there is provided an assembling method for assembling a display screen assembly. The assembling method includes:

providing a bracket having a top portion;
providing a decoration enclosure having a side surface;
providing a display screen and a cover plate, the cover plate having a side edge, and the display screen having a width greater than that of the cover plate;
mounting the display screen and the cover plate on the top portion of the bracket, the side edge of the cover plate being indented inwards relative to the display screen; and
joining the side surface of the decoration enclosure with the side edge of the cover plate by dispensing an adhesive therebetween and shielding a non-display area of the display screen by the decoration enclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and readily appreciated from descriptions made with reference to following drawings.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise", should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, the term "a plurality of" means two or more than two, unless specified otherwise.

In the present disclosure, unless specified or limited otherwise, the terms "mounted", "connected", "joined", "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on", "above", or "on top of" a second feature may include an embodiment in which the first feature is right "on", "above" or "on top of" the second feature, and may also include an embodiment in which the first feature is not right "on", "above" or "on top of" the second feature, or just means that the first feature has a sea level elevation larger than the sea level elevation of the second feature. While first feature "beneath", "below" or "on bottom of" a second feature may include an embodiment in which the first feature is right "beneath", "below" or "on bottom of" the second feature, and may also include an embodiment in which the first feature is not right "beneath", "below" or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

Figure 1:
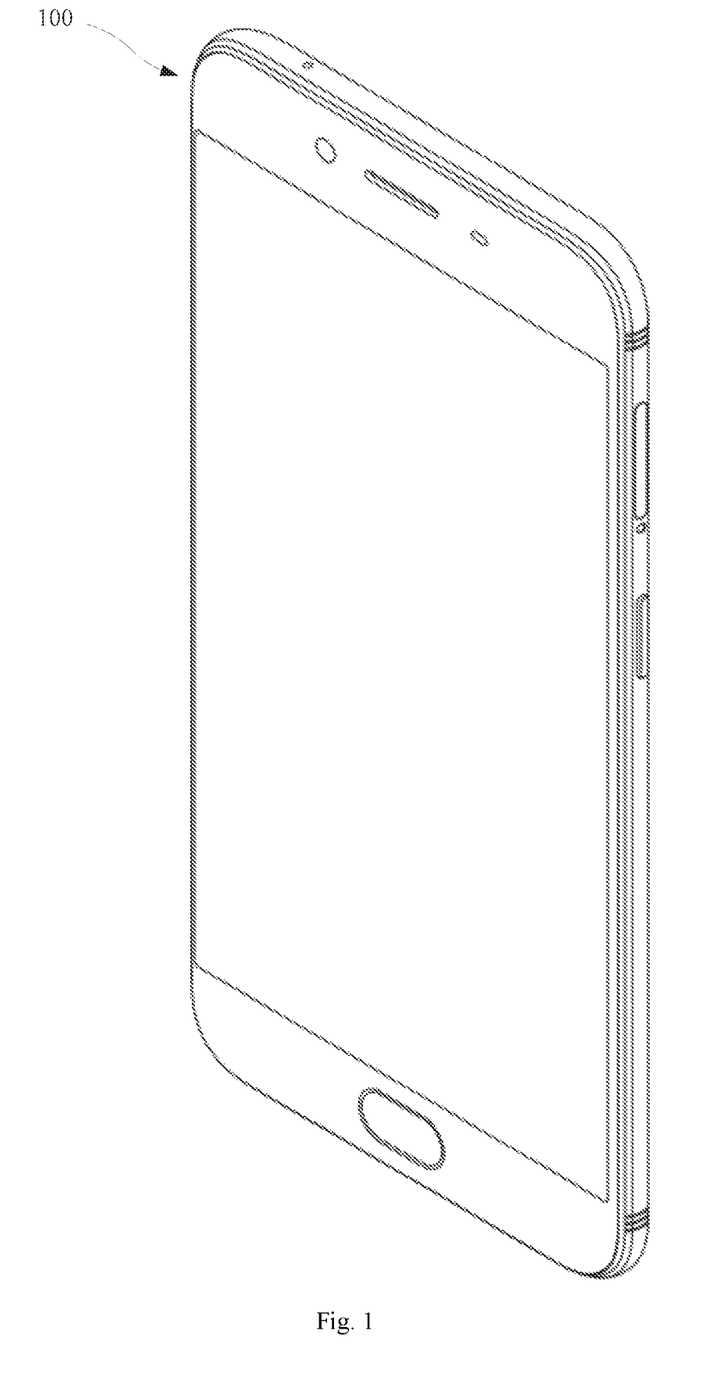
FIG. 1 illustrates a perspective view of an electronic device according to an embodiment of the present disclosure.
Figure 2:
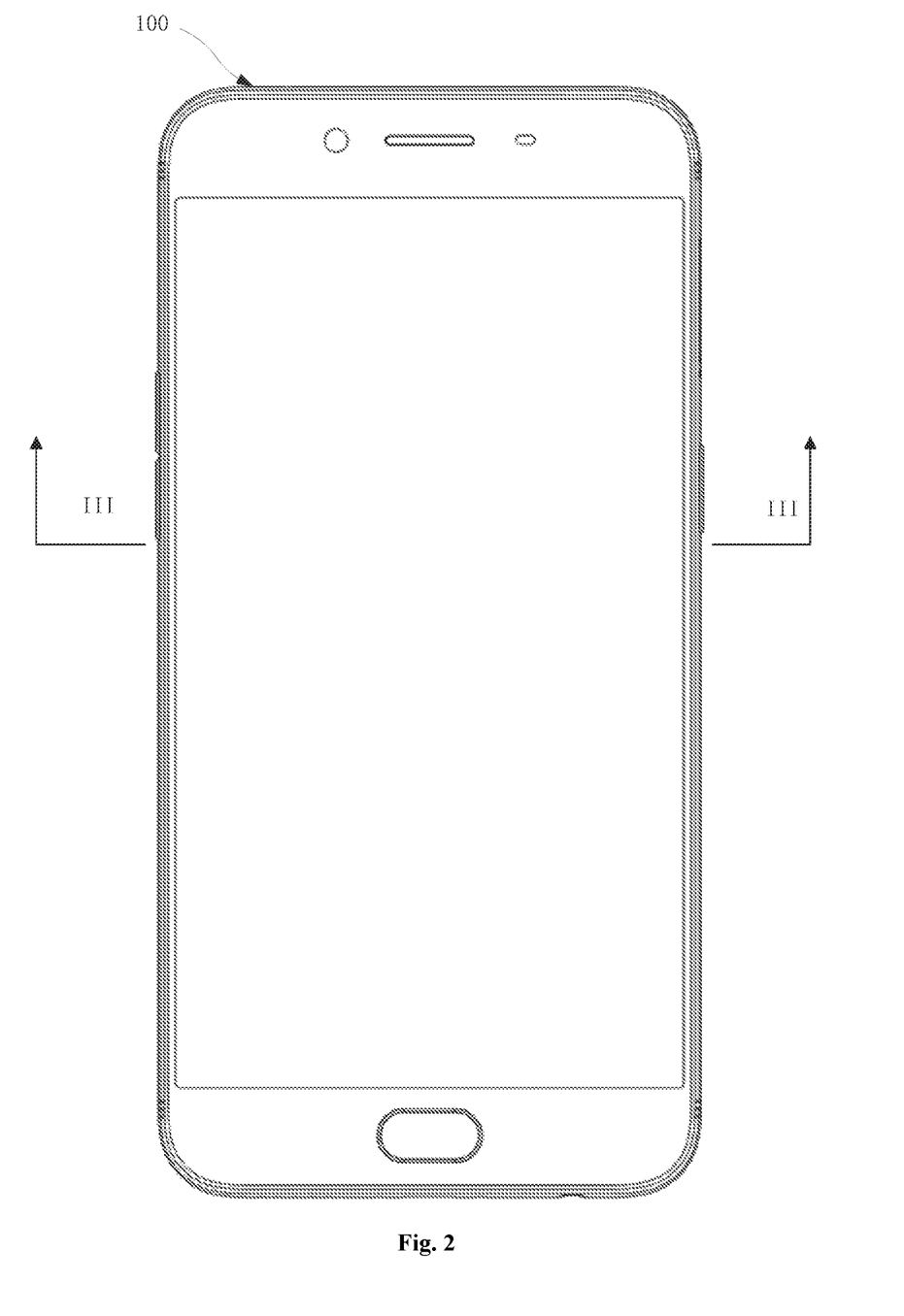
FIG. 2 illustrates a plan view of an electronic device according to an embodiment of the present disclosure.
Figure 3:
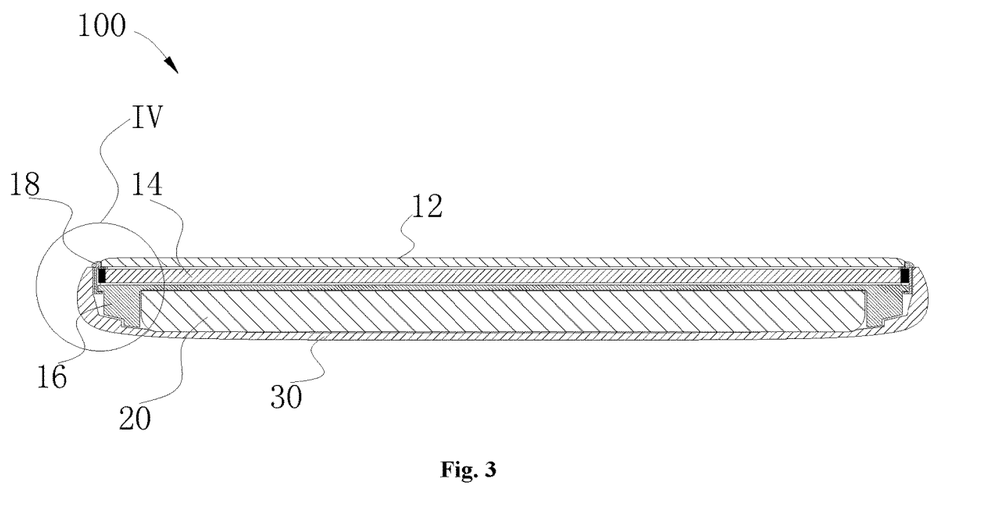
FIG. 3 illustrates a sectional view of the electronic device in FIG. 2 taken along line III-III.

As illustrated in FIGS. 1 to 3, an electronic device 100 according to embodiments of the present disclosure includes a display screen assembly 10, a rear cover 20 and a battery 30. The electronic device 100 can be a mobile phone, a tablet computer, a smart watch or the like.

Figure 5:
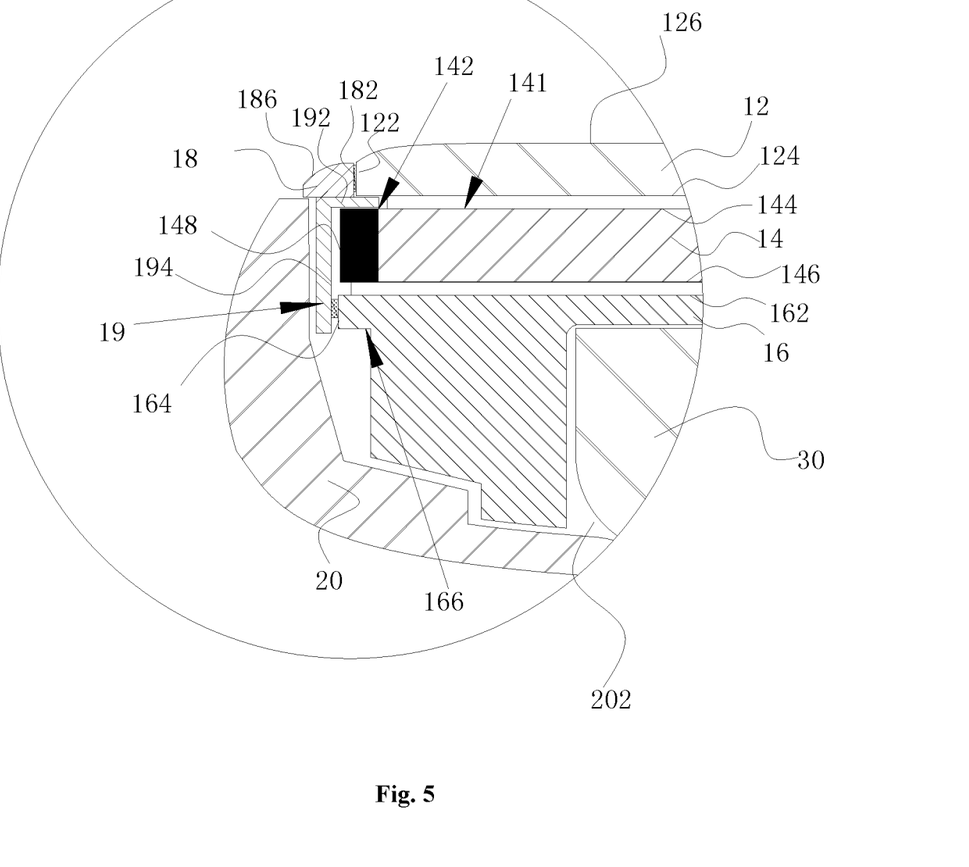
FIG. 5 illustrates a sectional view of an electronic device according to some embodiments of the present disclosure.
Figure 6:
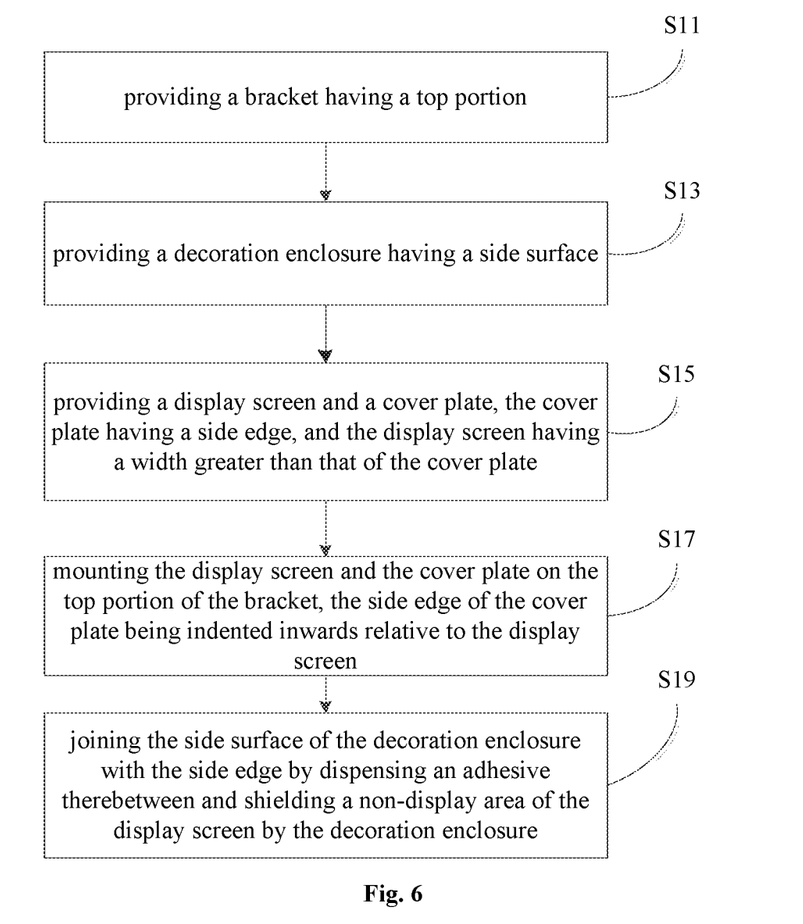
FIG. 6 illustrates a flow chart of an assembling method of a display screen assembly according to some embodiments of the present disclosure.

In some embodiments, the display screen assembly 10 is configured to display images, texts and so on. Moreover, the display screen assembly 10 can also be configured to receive a touch operation of a user. As illustrated in FIG. 5 and FIG. 6, the display screen assembly 10 includes a cover plate 12, a display screen 14, a bracket 16, a decoration enclosure 18 and a reinforcing piece 19.

Figure 4:
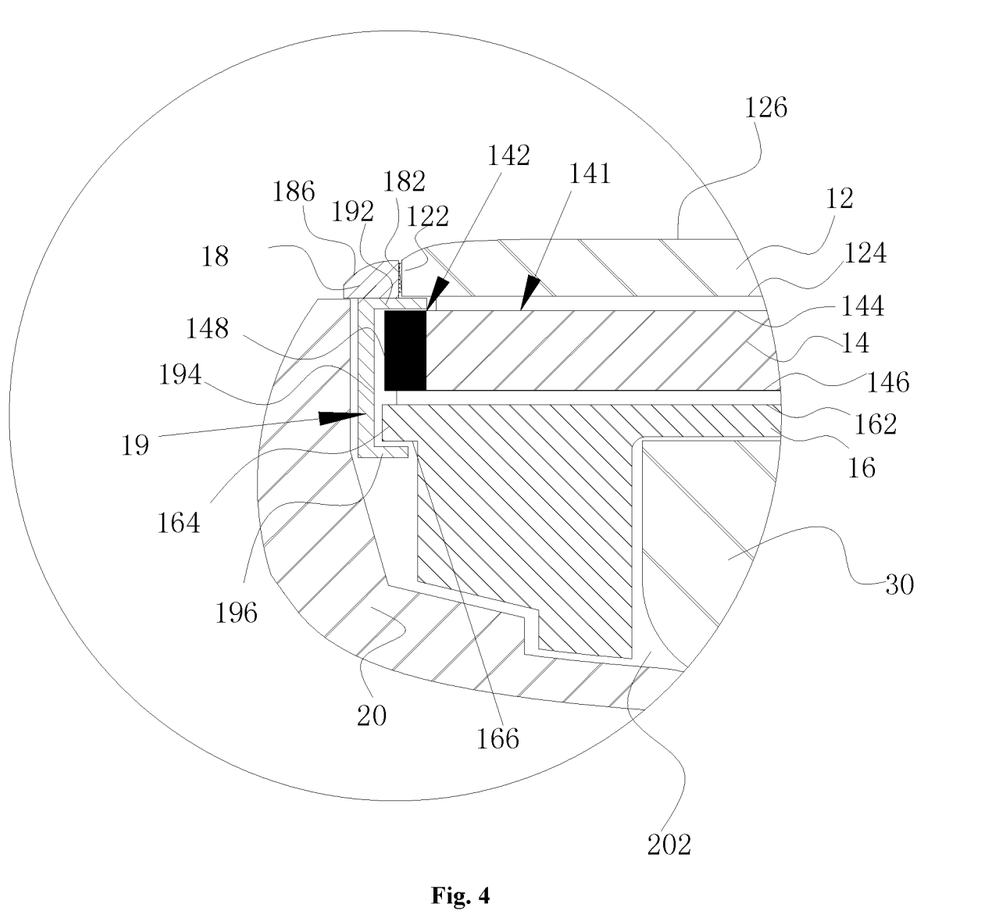
FIG. 4 illustrates an enlarged view of portion IV in FIG. 3.

As illustrated in FIG. 4, the cover plate 12 is configured as a touch-screen cover plate. In other words, a touch control circuit of a touch screen is integrated in the cover plate 12, and a touch control function can be achieved by clicking the cover plate 12. The cover plate 12 can be made of materials such as glass, sapphire, polyvinyl chloride (PVC), etc. In some embodiments, the cover plate 12 is configured to have two layers of structures, namely a touch panel and a protection cover sheet disposed on the touch panel. The touch panel is configured to achieve a touch operation of the display screen assembly 10, and the protection cover sheet is configured to protect the touch panel from being damaged due to direct touch operations on the touch panel. A side edge 122 of the cover plate 12 is configured as an inclined surface. In other words, the cover plate 12 has a trapezoidal cross section. An area of an upper surface 126 of the cover plate 12 is less than an area of a lower surface 124 of the cover plate 12. The side surface 182 of the decoration enclosure 18 is also configured as another inclined surface. These above two inclined surfaces are fitted with and joined to each other, such that the decoration enclosure 18 is coupled to the cover plate 12.

A top surface 144 of the display screen 14 is joined with the lower surface 124 of the cover plate 12. The lower surface 124 of the cover plate 12 and the top surface 144 of the display screen 14 can be laminated in a full lamination manner. In some embodiments, the lower surface 124 of the cover plate 12 and the top surface 144 of the display screen 14 can be laminated by means of an optically clear adhesive (OCA). A width of the display screen 14 is larger than a width of the cover plate 12, and the side edge 122 of the cover plate 12 is indented inwards relative to the display screen 14. In other words, the cover plate 12 cannot cover the display screen 14 completely. The display screen 14 and the cover plate 12 are laminated in a full lamination manner. The display screen 14 can be configured as a liquid crystal display (LCD), an organic light-emitting diode (OLED) display screen or a flexible OLED display screen. The display screen 14 includes a display area 141 and a non-display area 142, the display area 141 is configured to achieve a function of the display screen assembly 10 for displaying images, texts or the like, and the non-display area 142 is configured for wiring.

The bracket 16 includes a top portion 162, and a bottom surface 146 of the display screen 14 is joined with the top portion 162 of the bracket. In some embodiments, the bottom surface 146 of the display screen 14 is joined with the top portion 162 of the bracket in an adhering manner. In some embodiments, the adhering manner can be achieved by dispensing an adhesive and/or using a double sided adhesive.

A side surface 182 of the decoration enclosure 18 is joined with the side edge 122 of the cover plate 12 by dispensing an adhesive therebetween, and hence the decoration enclosure 18 shields the non-display area 142 of the display screen 14. The side surface 182 of the decoration enclosure 18 has an inclined angle approximate to or consistent with an inclined angle of the side edge 122 of the cover plate 12. For example, the side surface 182 of the decoration enclosure 18 and the side edge 122 of the cover plate 12 both incline towards the same side, or both are perpendicular to the lower surface 124 of the cover plate 12. The decoration enclosure 18 protrudes towards the side edge 122 of the cover plate to compensate a width difference between the cover plate 12 and the display screen 14 so as to enclose the display screen 14 in the display screen assembly 10. An outer surface 186 of the decoration enclosure 18 is configured as an arc shape. In some embodiments, the decoration enclosure 18 can surround the side edge 122 of the cover plate 12. A material of the decoration enclosure 18 can be plastic, such as rigid plastics acrylonitrile-butadiene-styrene (ABS), polyvinyl chloride (PVC), or polycarbonate (PC), or can be a flexible material such as silica gel or polyolefin elastomer (POE). In some embodiments, the material of the decoration enclosure 18 is not limited to the above materials, and appropriate materials can be selected according to needs in practical applications.

The reinforcing piece 19 includes a first joining part 192, a second joining part 194 bending from the first joining part 192, and a third joining part 196 bending from the second joining part 194. The first joining part 192 is arranged between the cover plate 12 and the display screen 14 and is joined with the decoration enclosure 18. In some embodiments, the reinforcing piece 19 is joined with the decoration enclosure 18 by means of in-mold injection molding. The bracket 16 includes a back surface 166 opposite to the top portion 162. The third joining part 196 abuts against the back surface 166 of the bracket 16 and is hooked on the back surface 166 of the bracket 16. In some embodiments, the reinforcing piece 19 has a section in a shape of "⌐", and a side surface 148 of the display screen 14 and a side surface 164 of the bracket 16 are embedded in a recess of the reinforcing piece 19 and opposite to the second joining part 194. In other words, the section of the reinforcing piece 19 has a shape of a rectangle which is opened at one side thereof, and the side surface 148 of the display screen 14 and the side surface 164 of the bracket 16 are inserted in the open rectangle and opposite to the second joining part 194. In an embodiment of the present disclosure, the reinforcing piece 19 can be a bendable metal sheet, such as a steel sheet, a magnesium alloy sheet or the like.

The rear cover 20 is joined with the display screen assembly 10 to define an accommodating space 202, and the battery 30 is received in the accommodating space. The accommodating space 202 has a size and a shape which are matched with a size and a shape of the battery 30 respectively. In some embodiments, the rear cover 20 can be joined to the bracket 16 or the decoration enclosure 18 by means of adhering, snapping or screwing. In some embodiments, a connection manner between the rear cover 20 and the bracket 16 and/or between the rear cover 20 and the decoration enclosure 18 is not limited to the above kinds. The rear cover 20 can be joined with the display screen assembly 10 by selecting an appropriate manner in practical applications. The rear cover 20 can be made of metal materials, such as steel, aluminum alloy and magnesium alloy. In some embodiments, the rear cover 20 can also be made of non-metal materials, such as acrylonitrile-butadiene-styrene copolymer (ABS), polyvinyl chloride (PVC) and polycarbonate (PC). In some embodiments, the material of the rear cover 20 is not limited to the materials mentioned above, and an appropriate material can be selected according to requirements in practical applications.

In the display screen assembly 10 according to embodiments of the present disclosure, the reinforcing piece 19 is firstly joined with the decoration enclosure 18 by means of in-mold injection molding, then the display screen 14 and the cover plate 12 are laminated in a full lamination manner, and further the bottom surface 146 of the display screen 14 is joined with the top portion 162 of the bracket 16 in an adhering manner. A lower end of the reinforcing piece 19 is bent towards the back surface 166 of the bracket 16 so as to form the third joining part 196, and the third joining part 196 abuts against the back surface 166 of the bracket 16 and is hooked on the back surface 166 of the bracket 16, such that the section of the reinforcing piece 19 has the shape of "⌐". The side surface 148 of the display screen 14 and the side surface 164 of the bracket 16 are embedded in the recess of the reinforcing piece 19 and opposite to the second joining part 194, such that the display screen assembly 10 is formed. In some embodiments, the display screen 14 can also be firstly adhered to the top portion 162, and then the cover plate 12 is fully laminated to the display screen 14.

In the display screen assembly 10 according to embodiments of the present disclosure, the decoration enclosure 18 protrudes towards the side edge 122 of the cover plate 12, and the side surface 182 of the decoration enclosure 18 is joined with the side edge 122 of the cover plate 12 by dispensing an adhesive therebetween, so as to shield the non-display area 142 of the display screen 14. However, the cover plate 12 in the related art is screen-printed with a circle of black-ink edge at its periphery to shield the non-display area 142 of the display screen 14 and other internal structures. In the display screen assembly 10 according to embodiments of the present disclosure, since structures of the decoration enclosure 18, the cover plate 12 and the display screen 14 are reasonably designed, the side surface 182 of the decoration enclosure 18 is joined with the side edge 122 of the cover plate 12 to shield the non-display area 142 of the display screen 14 and other internal structures, thus replacing the function of the black-ink edge in the related art, reducing the width of the black-ink edge, and making the black-ink edge ultra-narrow or even eliminating the black-ink edge.

The display screen assembly 10 according to embodiments of the present disclosure enables the black-ink edge of the cover plate 12 to be ultra-narrow or even eliminates the black-ink edge of the cover plate 12. When the display screen assembly 10 according to embodiments of the present disclosure is applied to an electronic device 100, a user will see an ultra-narrow black-ink edge or no black-ink edge on the screen. Thus, a screen-to-body ratio is increased, a product quality is enhanced and a user experience is improved.

Further, the first joining part 192 of the reinforcing piece 19 is connected to the decoration enclosure 18, and the side surface 182 of the decoration enclosure 18 is joined with the side edge 122 of the cover plate 12 by dispensing an adhesive therebetween, such that the reinforcing piece 19 is indirectly connected to the cover plate 12. Moreover, the third joining part 196 is hooked on the back surface of the bracket 16, and the side surface 148 of the display screen 14 and the side surface 164 of the bracket 16 are embedded in the recess of the reinforcing piece 19 and opposite to the second joining part 194, such that the reinforcing piece 19 connects the cover plate 12 with the bracket 16. When the electronic device 100 is rapidly thrown upwards, falls down or crashes against other objects, a force exerted on the display screen 14 can be reduced so as to protect the display screen 14.

Furthermore, the side surface 182 of the decoration enclosure 18 is joined with the side edge 122 of the cover plate 12 by dispensing an adhesive therebetween. This joining manner of dispensing adhesive allows the side surface 182 of the decoration enclosure 18 to be fixedly coupled to the side edge 122 of the cover plate 12, and also provides a good sealing performance to achieve a waterproof function. Thus, a waterproof performance of the electronic device 100 is enhanced, and the user experience is further improved.

In addition, when the electronic device 100 is configured as the mobile phone, the tablet computer or other handheld electronic devices, the outer surface 186 of the decoration enclosure 18 which has the arc shape can improve a hand feel of holding the electronic device 100 by hands. Thus, the user can hold the electronic device 100 by hands comfortably.

As illustrated in FIG. 5, in some embodiments, the reinforcing piece 19 includes a first joining part 192 and a second joining part 194 bending from the first joining part 192. The first joining part 192 is arranged between the cover plate 12 and the display screen 14, and joined with the decoration enclosure 18. In some embodiments, the reinforcing piece 19 is joined with the decoration enclosure 18 by means of in-mold injection molding. The second joining part 194 can be joined with the side surface 164 of the bracket 16 in an adhering manner.

As illustrated in FIG. 4 to FIG. 6, an assembling method according to embodiments of the present disclosure is used for assembling the display screen assembly 10, and the assembling method includes actions at following blocks.

At block S11: a bracket 16 is provided, and the bracket 16 includes a top portion 162.

At block S13: a decoration enclosure 18 is provided, and the decoration enclosure 18 includes a side surface 182.

At block S15: a display screen 14 and a cover plate 12 are provided, the cover plate 12 includes a side edge 122, and the display screen 14 has a width greater than that of the cover plate 12.

At block S17: the display screen 14 and the cover plate 12 are mounted to the top portion 162, and the side edge of the cover plate 12 is indented inwards relative to the display screen 14.

At block S19: the side surface 182 of the decoration enclosure 18 is joined with the side edge 122 by dispensing an adhesive therebetween, and the decoration enclosure 18 shields a non-display area 142 of the display screen 14.

The cover plate 12 is configured as a touch-screen cover plate. In other words, a touch control circuit of a touch screen is integrated in the cover plate 12, and a touch control function can be achieved by clicking the cover plate 12. The cover plate 12 can be made of materials such as glass, sapphire, polyvinyl chloride (PVC), etc. In some embodiments, the cover plate 12 is configured to have two layers of structures, namely a touch panel and a protection cover sheet disposed on the touch panel. The touch panel is configured to achieve a touch operation of the display screen assembly 10, and the protection cover sheet is configured to protect the touch panel from being damaged due to direct touch operations on the touch panel. The side edge 122 of the cover plate 12 is configured as an inclined surface. In other words, the cover plate 12 has a trapezoidal cross section. An area of an upper surface 126 of the cover plate 12 is less than an area of a lower surface 124 of the cover plate 12. The side surface 182 of the decoration enclosure 18 is configured as another inclined surface. These above two inclined surfaces are fitted with and joined to each other, such that the decoration enclosure 18 is coupled to the cover plate 12.

The bracket 16 includes a top portion 162, and a bottom surface 146 of the display screen 14 is joined with the top portion 162 of the bracket 16. In some embodiments, the bottom surface 146 of the display screen 14 is joined with the top portion 162 of the bracket in an adhering manner. In some embodiments, the adhering manner can be achieved by dispensing an adhesive and/or using a double sided adhesive.

The side surface 182 of the decoration enclosure 18 has an inclined angle approximate to or consistent with an inclined angle of the side edge 122 of the cover plate 12. For example, the side surface 182 of the decoration enclosure 18 and the side edge 122 of the cover plate 12 both incline towards the same side, or both are perpendicular to a lower surface 124 of the cover plate 12. The decoration enclosure 18 protrudes towards the side edge 122 of the cover plate to compensate a width difference between the cover plate 12 and the display screen 14 so as to enclose the display screen 14 in the display screen assembly 10. An outer surface 186 of the decoration enclosure 18 is configured as an arc shape. In some embodiments, the decoration enclosure 18 can surround the side edge 122 of the cover plate 12. A material of the decoration enclosure 18 can be plastic, such as rigid plastics acrylonitrile-butadiene-styrene (ABS), polyvinyl chloride (PVC), or polycarbonate (PC), or can be a flexible material such as silica gel or polyolefin elastomer (POE). In some embodiments, the material of the decoration enclosure 18 is not limited to the above materials, and appropriate materials can be selected according to needs in practical applications.

Figure 7:
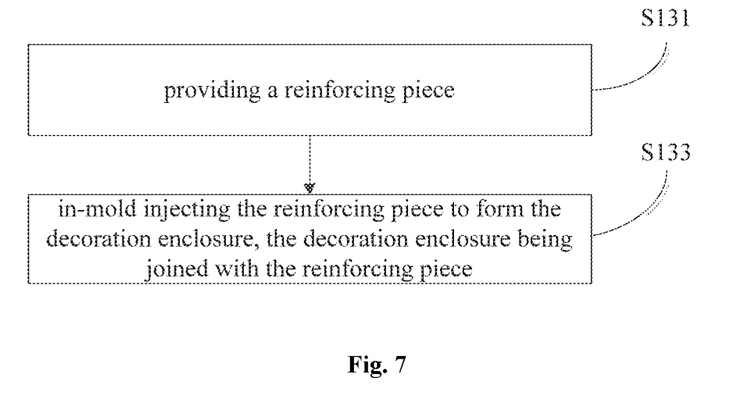
FIG. 7 illustrates a flow chart of an assembling method of a display screen assembly according to some embodiments of the present disclosure.

In combination with FIG. 7, in some embodiments, the action at block S13 includes actions at following blocks.

At block S131: a reinforcing piece 19 is provided.

At block S133: the reinforcing piece 19 is in-mold injected to form the decoration enclosure 18, and the decoration enclosure 18 is joined with the reinforcing piece 19. In other words, the reinforcing piece 19 is first placed in a mold, and then the decoration enclosure 18 is formed and joined to the reinforcing piece 19 by injection molding.

The reinforcing piece 19 includes a first joining part 192, a second joining part 194 bending from the first joining part 192, and a third joining part 196 bending from the second joining part 194. The first joining part 192 is arranged between the cover plate 12 and the display screen 14. The bracket 16 includes a back surface 166 opposite to the top portion 162, and the third joining part 196 abuts against the back surface 166 of the bracket 16 and is hooked on the back surface 166 of the bracket 16. In some embodiments, the reinforcing piece 19 has a section in a shape of "⌐", and a side surface 148 of the display screen 14 and a side surface 164 of the bracket 16 are embedded in a recess of the reinforcing piece 19 and opposite to the second joining part 194. In other words, the section of the reinforcing piece 19 has a shape of a rectangle which is opened at one side thereof, and the side surface 148 of the display screen 14 and the side surface 164 of the bracket 16 are inserted in the open rectangle and opposite to the second joining part 194. In an embodiment of the present disclosure, the reinforcing piece 19 can be a bendable metal sheet, such as a steel sheet, a magnesium alloy sheet or the like. In some embodiments, the reinforcing piece 19 can also include a first joining part 192 and a second joining part 194 bending from the first joining part 192. The first joining part 192 is arranged between the cover plate 12 and the display screen 14 and is joined with the decoration enclosure 18. The second joining part 192 can be joined with the side surface 164 of the bracket 16 in an adhering manner.

Figure 8:
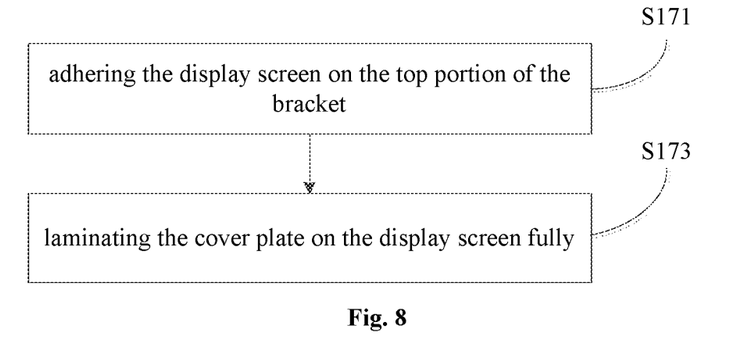
FIG. 8 illustrates a flow chart of an assembling method of a display screen assembly according to some embodiments of the present disclosure.

In combination with FIG. 8, in some embodiments, the action at block S17 includes actions at following blocks.

At block S171: the display screen 14 is adhered on the top portion 162.

At block S173: the cover plate 12 is fully laminated on the display screen 14.

The lower surface 124 of the cover plate 12 and the top surface 144 of the display screen can be laminated by means of an optically clear adhesive (OCA). A width of the display screen 14 is larger than a width of the cover plate 12, and the side edge 122 of the cover plate 12 is indented inwards relative to the display screen 14. In other words, the cover plate 12 cannot cover the display screen 14 completely. The display screen 14 may be configured as a liquid crystal display (LCD), an organic light-emitting diode (OLED) display screen or a flexible OLED display screen. The display screen 14 includes a display area 141 and the non-display area 142, the display area 141 is configured to achieve a function of the display screen assembly 10 for displaying images, texts or the like, and the non-display area 142 is configured for wiring.

The display screen assembly 10 assembled by the assembling method according to embodiments of the present disclosure enables a black-ink edge of the cover plate 12 to be ultra-narrow or even eliminates the black-ink edge of the cover plate 12, so that when the display screen assembly 10 according to embodiments of the present disclosure is applied to an electronic device 100, a user will see an ultra-narrow black-ink edge or no black-ink edge on the screen. Thus, the screen-to-body ratio is increased, the product quality is enhanced and the user experience is improved.

Further, the first joining part 192 of the reinforcing piece 19 is connected to the decoration enclosure 18, and the side surface 182 of the decoration enclosure 18 is joined with the side edge 122 of the cover plate 12 by dispensing an adhesive therebetween, such that the reinforcing piece 19 is indirectly connected to the cover plate 12. Moreover, the third joining part 196 is hooked on the back surface of the bracket 16, and the side surface 148 of the display screen 14 and the side surface 164 of the bracket 16 are embedded in the recess of the reinforcing piece 19 and opposite to the second joining part 194, such that the reinforcing piece 19 connects the cover plate 12 with the bracket 16. When the electronic device 100 is rapidly thrown upwards, falls down or crashes against other objects, a force exerted on the display screen 14 can be reduced so as to protect the display screen 14.

Furthermore, the side surface 182 of the decoration enclosure 18 is joined with the side edge 122 of the cover plate 12 by dispensing an adhesive therebetween. This joining manner of dispensing adhesive allows the side surface 182 of the decoration enclosure 18 to be fixedly coupled to the side edge 122 of the cover plate 12, and also provides a good sealing performance to achieve a waterproof function. Thus, a water proof performance of the electronic device 100 is enhanced, and the user experience is further improved.

In addition, when the electronic device 100 is configured as the mobile phone, the tablet computer or other handheld electronic devices, the outer surface 186 of the decoration enclosure 18 which has the arc shape can improve a hand feel of holding the electronic device 100 by hands. Thus, the user can hold the electronic device 100 by hands comfortably.

Figure 9:
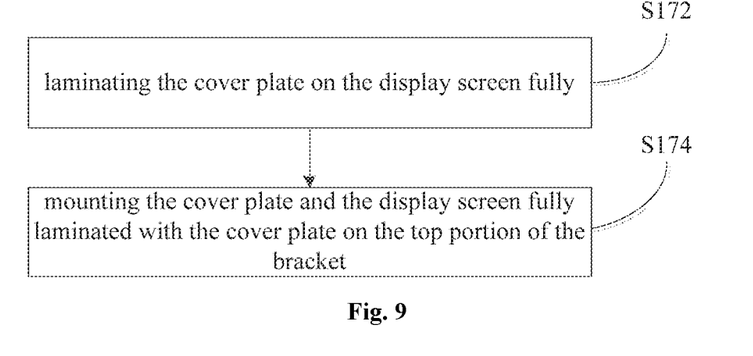
FIG. 9 illustrates a flow chart of an assembling method of a display screen assembly according to some embodiments of the present disclosure.

In combination with FIG. 9, in some embodiments, the action at block S17 includes actions at following blocks.

At block S172: the cover plate 12 is fully laminated on the display screen 14.

At block S174: the cover plate 12 and the display screen 14 fully laminated with the cover plate 12 are mounted on the top portion 162.

In other words, the display screen 14 can be adhered to the top portion 162 first, and then the cover plate 12 is fully laminated on the display screen 14. Alternatively, the cover plate 12 can be fully laminated with the display screen 14 first, and then the bottom surface 146 of the display screen 14 is adhered on the top portion 162.

Reference throughout this specification to "an embodiment", "some embodiments", "an illustrative embodiment", "an example", "a specific example" or "some examples", means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more of this feature. In the description of the present disclosure, the term "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is limited by the claims and its equivalence.

What is claimed is:

1. A display screen assembly, comprising:
    a cover plate having a straight shape and comprising a side edge;
    a display screen having a top surface joined with a lower surface of the cover plate, the display screen also having a straight shape, a width of the display screen being larger than a width of the cover plate, and the side edge of the cover plate being indented inwards relative to the display screen;
    a bracket having a top portion joined with a bottom surface of the display screen; and
    a decoration enclosure having a side surface joined with the side edge of the cover plate and configured to shield a non-display area of the display screen, the decoration enclosure further having a bottom surface which is flat and in flush with the lower surface of the cover plate,
    wherein the display screen assembly further comprises a reinforcing piece, the reinforcing piece comprises a first joining part and a rest joining part bending from the first joining part,
    the first joining part is arranged between the cover plate and the display screen, and is joined with the decoration enclosure by means of in-mold injection molding, and the rest joining part is coupled to the bracket, so as to clamp the display screen between the cover plate and the bracket.

2. The display screen assembly according to claim 1, wherein the side edge of the cover plate is configured as a first inclined surface, the side surface of the decoration enclosure is configured as a second inclined surface, and the first inclined surface and the second inclined surface are fitted with and joined to each other.

3. The display screen assembly according to claim 1, wherein
    the rest joining part comprises a second joining part bending from the first joining part and joined with a side surface of the bracket.

4. The display screen assembly according to claim 1, wherein the rest joining part comprises a second joining part bending from the first joining part, and a third joining part bending from the second joining part, and
the bracket comprises a back surface opposite to the top portion thereof, and the third joining part abuts against the back surface of the bracket.

5. The display screen assembly according to claim 1, wherein the top surface of the display screen is joined with the lower surface of the cover plate in a full lamination manner.

6. The display screen assembly according to claim 1, wherein the top surface of the display screen is laminated with the lower surface of the cover plate by means of an optically clear adhesive.

7. The display screen assembly according to claim 1, wherein the bottom surface of the display screen is joined with the top portion of the bracket in an adhering manner.

8. The display screen assembly according to claim 1, wherein the cover plate is configured as a touch-screen cover plate.

9. The display screen assembly according to claim 8, wherein the cover plate comprises:
a touch panel having a touch control circuit and configured to achieve a touch operation of the display screen assembly; and
a protective cover sheet provided on the touch panel and configured to protect the touch panel from being damaged due to direct touch operations on the touch panel.

10. An electronic device, comprising a display screen assembly and a rear cover coupled to the display screen assembly to define an accommodating space therebetween, wherein the display screen assembly comprises:
a cover plate having a straight shape and comprising a side edge;
a display screen having a top surface joined with a lower surface of the cover plate, the display screen also having a straight shape, a width of the display screen being larger than a width of the cover plate;
a bracket having a top portion joined with a bottom surface of the display screen; and
a decoration enclosure joined with the side edge of the cover plate and configured to shield a non-display area of the display screen, the decoration enclosure having a bottom surface which is flat and in flush with the lower surface of the cover plate,
wherein the display screen assembly further comprises a reinforcing piece, the reinforcing piece comprises a first joining part and a rest joining part bending from the first joining part,
the first joining part is arranged between the cover plate and the display screen, and is joined with the decoration enclosure by means of in-mold injection molding, and the rest joining part is coupled to the bracket, so as to clamp the display screen between the cover plate and the bracket.

11. The electronic device according to claim 10, further comprising a battery, wherein the battery is received in the accommodating space.

12. The electronic device according to claim 10, wherein the rear cover is coupled to at least of the bracket and the decoration enclosure.

13. The electronic device according to claim 12, wherein the rear cover is coupled to the bracket by at least one of adhering, snapping, threaded connection and screwing.

14. The electronic device according to claim 12, wherein the rear cover is coupled to the decoration enclosure by at least one of adhering, snapping, threaded connection and screwing.

15. An assembling method for assembling a display screen assembly, comprising:
providing a bracket having a top portion;
providing a decoration enclosure having a side surface;
providing a display screen and a cover plate, the cover plate having a side edge, and the display screen having a width greater than that of the cover plate;
mounting the display screen and the cover plate on the top portion of the bracket, the side edge of the cover plate being indented inwards relative to the display screen; and
joining the side surface of the decoration enclosure with the side edge of the cover plate by dispensing an adhesive therebetween and shielding a non-display area of the display screen by the decoration enclosure,
wherein providing a decoration enclosure comprises:
providing a reinforcing piece; and
in-mold injecting the reinforcing piece to form the decoration enclosure, the decoration enclosure being joined with the reinforcing piece,
wherein the cover plate and the display screen both have a straight shape, the decoration enclosure has a bottom surface which is flat and in flush with a lower surface of the cover plate,
wherein the reinforcing piece comprises a first joining part and a rest joining part bending from the first joining part,
the first joining part is arranged between the cover plate and the display screen, and is joined with the decoration enclosure by means of in-mold injection molding, and the rest joining part is coupled to the bracket, so as to clamp the display screen between the cover plate and the bracket.

16. The assembling method according to claim 15, wherein mounting the display screen and the cover plate on the top portion of the bracket comprises:
adhering the display screen on the top portion of the bracket; and
laminating the cover plate on the display screen fully.

17. The assembling method according to claim 15, wherein mounting the display screen and the cover plate on the top portion of the bracket comprises:
laminating the cover plate on the display screen fully; and
mounting the cover plate and the display screen fully laminated with the cover plate on the top portion of the bracket.

* * * * *